(12) United States Patent
Carreiro et al.

(10) Patent No.: US 11,039,278 B1
(45) Date of Patent: Jun. 15, 2021

(54) DYNAMIC LOCATION COLLECTION

(71) Applicant: Facebook, Inc., Menlo Park, CA (US)

(72) Inventors: Jason Michael Carreiro, Mansfield, MA (US); Lionel Laurent Reyero, Cambridge, MA (US); Jacob Perkowski, Waltham, MA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/119,751

(22) Filed: Aug. 31, 2018

(51) Int. Cl.
| | |
|---|---|
| *H04W 4/029* | (2018.01) |
| *H04W 52/02* | (2009.01) |
| *H04W 4/21* | (2018.01) |
| *H04W 24/10* | (2009.01) |
| *H04W 8/24* | (2009.01) |

(52) U.S. Cl.
CPC ............. *H04W 4/029* (2018.02); *H04W 4/21* (2018.02); *H04W 8/24* (2013.01); *H04W 24/10* (2013.01); *H04W 52/0261* (2013.01)

(58) Field of Classification Search
CPC ....... H04W 4/029; H04W 4/021; H04W 8/24; H04W 24/10; H04W 52/061
See application file for complete search history.

(56) References Cited

U.S. PATENT DOCUMENTS

| | | | | |
|---|---|---|---|---|
| 2012/0184287 A1* | 7/2012 | Jovicic | .................. | G01S 5/0009 455/456.1 |
| 2014/0253377 A1* | 9/2014 | Scalisi | .................... | G01S 19/34 342/357.74 |
| 2015/0301579 A1* | 10/2015 | Vaccari | .................. | G06F 1/3209 713/340 |

* cited by examiner

*Primary Examiner* — Joshua L Schwartz
(74) *Attorney, Agent, or Firm* — Baker Botts L.L.P.

(57) ABSTRACT

A method includes determining an operating condition associated with a mobile device based on contextual information associated with one or more of usage information of the mobile device, user activity of a user of the mobile device, or location information. If the operating condition satisfies a threshold power-consumption condition, the method further includes adjusting a frequency of collecting location information of the mobile device and collecting information on a plurality of locations associated with the mobile device for a particular time period based on the adjusted frequency of collecting the location information. The method further includes adjusting a frequency of uploading collected location information to a server associated with a social-networking system and sending the information on the plurality of locations for a particular time period to the social-networking system based on the adjusted frequency of uploading collected location information for building a location timeline for the mobile device.

18 Claims, 6 Drawing Sheets

DYNAMIC LOCATION COLLECTION

TECHNICAL FIELD

This disclosure relates generally to geographic positioning-capable devices, and, more particularly, to methods of continuously reporting location information relevant to a user to build a location timeline.

BACKGROUND

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

The embodiments disclosed herein are directed to a method for determining when and how frequently to report location information by a user's device to build a location timeline for the user while minimizing the burden and resource strain on the user device associate with collecting location information and sending the location data to servers associated with a social-networking system. In particular embodiments, the mobile device may determine an operating condition based on contextual information associated with one or more of usage information of the mobile device, user activity of a user of the mobile device, or location information of the mobile device. If the mobile device determines that the operating condition satisfies a threshold power-consumption condition, then the mobile device may adjust a frequency of collecting location information, and then collect information on a plurality of locations associated with the mobile device for a particular time period based on the adjusted frequency of collecting the location information. The method may further include the mobile device adjusting a frequency of uploading collected location information to a server associated with a social-networking system, and then sending the information on the plurality of locations associated with the mobile device for a particular time period to the social-networking system based on the adjusted frequency. In particular embodiments, the threshold power-consumption condition may be determined by accessing a maximum frequency of collecting location information for minimizing power consumption of the mobile device. Alternatively, the threshold power-consumption condition may be determined by accessing an optimal timing for collecting location information based on one or more location-information requests from the social-networking system. In particular embodiments, the frequency of collecting location information at the mobile device may be adjusted separately from the frequency of uploading collected location information to the server associated with the social-networking system.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
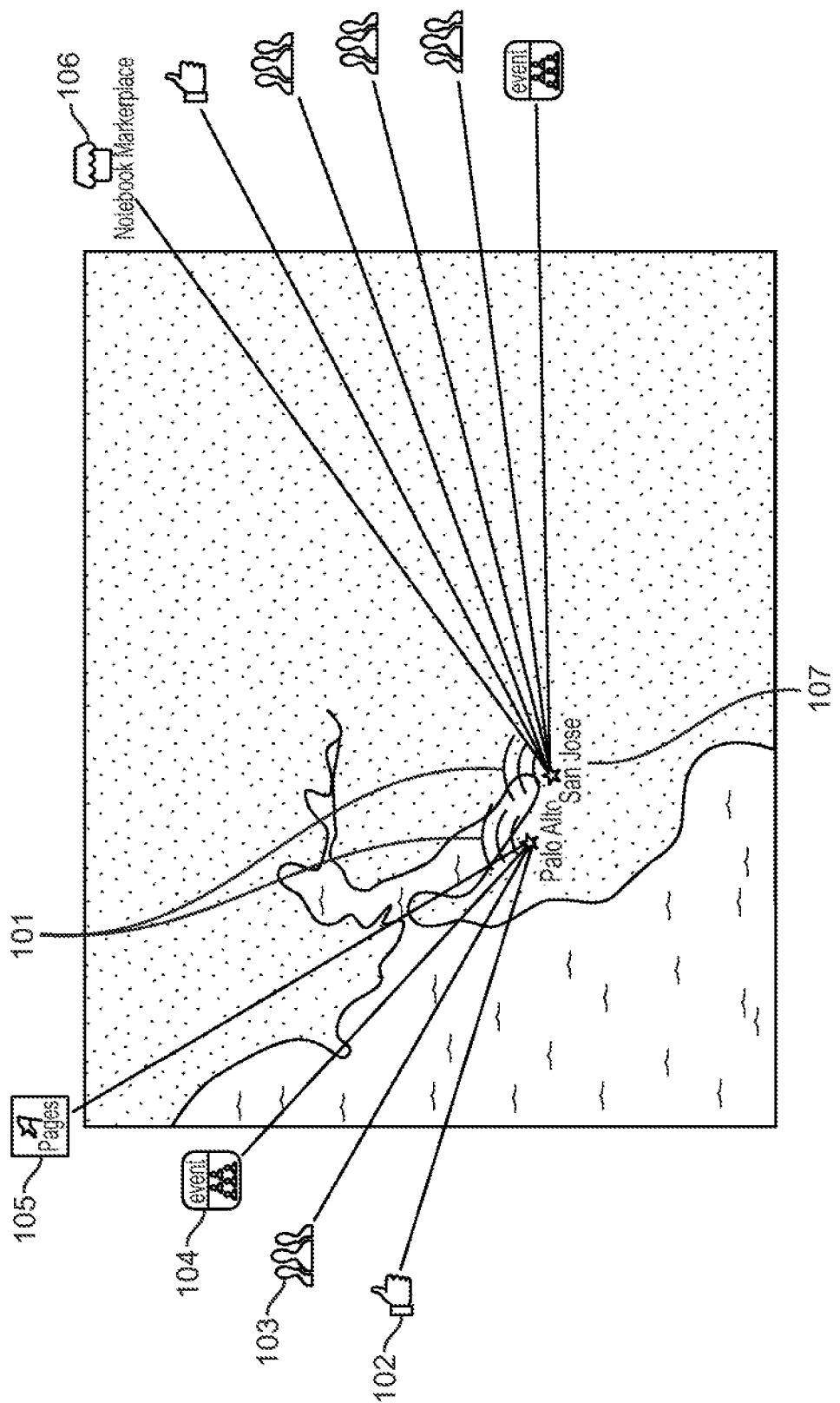
FIG. 1A illustrates examples of sources that may be used to determine and collect location data.

A social-networking system, such as a social-networking website, enables its users to interact with it, and with each other through, the system. Typically, to become a registered user of a social-networking system, an entity, either human or non-human, registers for an account with the social-networking system. Thereafter, the registered user may log into the social-networking system via an account by providing, for example, a login ID or username and password. As used herein, a "user" may be an individual (human user), an entity (e.g., an enterprise, business, or third-party application), or a group (e.g., of individuals or entities) that interacts or communicates with or over such a social network environment.

When a user registers for an account with a social-networking system, the social-networking system may create and store a record, often referred to as a "user profile," in connection with the user. The user profile may include information provided by the user and information gathered by various systems, including the social-networking system, relating to activities or actions of the user. For example, the user may provide his name, profile picture, contact information, birth date, gender, marital status, family status, employment, education background, preferences, interests, and other demographic information to be included in his user profile. The user may identify other users of the social-networking system that the user considers to be his friends. A list of the user's friends (e.g., first degree contacts) may be included in the user's profile. Connections in social-networking systems may be in both directions or may be in just one direction. Some embodiments of a social-networking system allow the connection to be indirect via one or more levels of connections (e.g., friends of friends). Connections may be added explicitly by a user, for example, the user selecting a particular other user to be a friend, or automatically created by the social-networking system based on common characteristics of the users (e.g., users who are alumni of the same educational institution). The user may identify or bookmark websites or web pages he visits frequently, and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social-networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

As described in detail below, a social network system may maintain social graph information, which can generally model the relationships among groups of individuals and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social-networking system may maintain a database of information relating to geographic locations or places. Places may correspond to various physical locations, such as restaurants, bars, train stations, airports and the like. In one embodiment, each place may be maintained as a hub node in a social graph or other data structure maintained by the social-networking system, as described in U.S. patent application Ser. No. 12/763,171, which is incorporated herein by reference. The social-networking system may allow users to access information regarding each place using a client application (e.g., a browser) hosted by a wired or wireless station, such as a laptop, desktop or mobile device. For example, social-networking system may serve web pages (or other structured documents) to users that request information about a place. In addition to user profile and place information, the social-networking system may log or maintain other information about the user. For example, the social-networking system may support geo-social-networking system functionality including one or more location-based services that record the user's location. For example, users may access the geo-social-networking system using a special-purpose client application hosted by a mobile device of the user (or a web- or network-based application using a browser client). The client application may automatically access Global Positioning System (GPS) or other geo-location functions supported by the mobile device and report the user's current location to the geo-social-networking system. In addition, the client application may support geo-social networking functionality that allows users to check-in at various locations and communicate this location to other users. A check-in to a given place may occur when a user is physically located at a place and, using a mobile device, access the geo-social-networking system to register the user's presence at the place. A user may select a place from a list of existing places near the user's current location or create a new place. The social-networking system may automatically check in a user to a place based on the user's current location and past location data, as described in U.S. patent application Ser. No. 13/042,357 filed on Mar. 7, 2011, which is incorporated herein by reference. An entry including a comment and a time stamp corresponding to the time the user checked in may be displayed to other users. For example, a record of the user's check-in activity may be stored in a database. The social-networking system may select one or more records associated with check-in activities of users at a given place and include such check-in activity in web pages (or other structured documents) that correspond to a given place. The check-in activity may also be displayed on a user profile page and in news feeds provided to users of the social-networking system.

In particular embodiments, a special purpose client application hosted on a mobile device of a user may be configured to continuously capture location data of the mobile device (e.g., based on a static frequency) and send the location data to social-networking system. In this manner, the social-networking system may log the user's location and provide various recommendations to the user related to places that are proximal to the user's current trajectory or path or that are frequented by the user. In one implementation, a user may opt in to this recommendation service, which causes the client application to periodically post location data of the user to the social-networking system.

In particular embodiments, the mobile device of the user may determine when and how frequently to capture location information for the mobile device and when to send the location information to the social-networking system while minimizing the burden and resource strain on the mobile device associated with reporting location data to the backend servers of the social-networking system. The location information sent to the social-networking system may be used to build a location timeline for the user, and that location data that is location data that will add the highest value to the location timeline for the user (e.g., by providing the most information while minimizing the burden and resource strain on the user device). As discussed above, location data collection by the mobile device may be hardcoded to a static frequency (e.g., every 2 minutes). However, this static frequency of location data collection may not be flexible enough to minimize device power consumption and resource strain on the mobile device. In particular embodiments described herein, the mobile device may dynamically adjust the frequency of collection of location data and the frequency at which the location data is reported from the user device to the servers of the social-networking system based on contextual factors such that the location data collection occurs when the location data will add the highest value to the location timeline for the user. In determining the contextual factors for optimizing the frequency and timing of the collection of location data or transmission of the location data to the servers of the social-networking system, the mobile device may consider one or more of: (1) mobile device usage information; (2) user-activity information; or (3) location-type information associated with a location of the mobile device.

Contextual factors for optimizing the frequency and timing of the collection of location data or transmission of the location data by the mobile device may include a mobile-device-specific element such as mobile device usage information to help define when location updates are most important. In particular embodiments, mobile device usage information relevant to the determination of when the mobile device can best capture and collect the location information and send the location information to the social-networking system may include one or more of: a signal strength of a communication signal (e.g., the signal strength of a GPS signal, a Wi-Fi signal, or a cellular radio signal); a speed of movement detected for the mobile device; a network bandwidth (e.g., the bandwidth capacity associated with a communication network that sends or receives data from the mobile device); or a battery-consumption percentage associated with the mobile device. As an example, when the mobile device determines that a communication signal strength is high, the mobile device may increase the frequency of collecting location data, in addition to the frequency and/or timing of when to send the collected location data to servers of the social-networking system. On the other hand, when the mobile device determines that the communication signal strength is low (e.g., based on lack of communication towers, distance to the closest communication towers, impediments disrupting the communication signal to/from the communication towers, etc.), the mobile device may decrease the frequency of collecting location data, and also decrease the frequency and/or timing of sending the collected location data to servers of the social-networking system. As another example, the mobile device may increase the frequency of collecting location data and/or sending the location data to servers of the social-networking system when it determines that it is moving at a slower speed, and conversely decrease the frequency of collecting location data and/or sending the location data to servers of the social-networking system when it determines that it is moving at a faster speed. As yet another example, the mobile device may increase the frequency of collecting location data and/or sending the location data to servers of the social-networking system when it determines that the bandwidth capacity of a communication network for sending or receiving data is high, and decrease the frequency of collecting location data and sending the location data to servers of the social-networking system when it determines that the bandwidth capacity of the communication network for sending and receiving data is low. As yet another example, the mobile device may increase the frequency of collecting location data and sending the location data to servers of the social-networking system when it determines that the battery percentage associated with the mobile device is high (e.g., the battery is over half charged and critical power needed for powering the mobile device is not depleted), and decrease the frequency of collecting location data and sending the location data to servers of the social-networking system when it is determined that the battery percentage associated with the mobile device is low (e.g., to conserve battery for powering the mobile device, or to not interfere with the charging of the mobile device).

Contextual factors for optimizing the frequency and timing of the collection of location data or transmission of the location data by the mobile device may also include a user-specific element such as user activity information to help define when location updates are most important. In particular embodiments, user-activity information relevant to the determination of when the mobile device can best collect the location information and send the location data to servers of the social-networking system may be defined on a per-user basis. As an example, the user activity-specific contextual factors in determining the frequency may include one of more of: the current location of the user (e.g., the mobile device may collect location data less frequently if it determines that the user's location is at the user's home or work, and more frequently if it determines that the user's location is a new place the user has not been to before); the current time (e.g., the mobile device may collect location data less frequently if it determines that the current time is late at night and the user goes to bed early); user habits (e.g., the mobile device may collect location data less frequently on a weekend day if it determines that the user always plays golf on a certain weekend day); day of the week (e.g., the mobile device may collect location data less frequently during the weekday if it determines that the user works typical work hours and is at one location during most work days); social and non-social signals (e.g., the mobile device may collect location information more frequently based on third party notifications, or push notifications from the social-networking system such as emergency notifications); and explicit user signals (e.g., the mobile device may collect location information more frequently in the case of the user making an emergency call, or based on heart rate signals monitored by the mobile device).

Contextual factors for optimizing the frequency and timing of the collection of location data or transmission of the location data by the mobile device may also include a location-specific element such as location-type information to help define when location updates are most important. In particular embodiments, location-type information relevant to the determination of when the mobile device can best capture and collect the location information and send the location information to the social-networking system may include the current location of the user (as discussed above); location categories (e.g., the mobile device may collect the location information and/or send the location data to servers of the social-networking system more frequently when the user is determined to be in a shopping zone, and less frequently when the user is determined to be at work). As another example, the mobile device may vary the frequency of collecting location information and/or sending the location data to servers of the social-networking system based on the presence of dead zones (e.g., the mobile device may collect the location information less frequently when the user is travelling through a desert). As yet another example, the mobile device may vary the frequency of collecting location information and/or sending the location data to servers of the social-networking system based on a social importance of the place to the user, as determined based on the social graph information discussed above, and also in more detail below. For example, the mobile device may increase the frequency for collecting the user's location information if it detects that the user is at a place that is determined to be a location the user has not been to before, or at a place that is determined to be associated with various offers (e.g., advertising offers) or significant events (e.g., events with the user's friends, events of social significance to the user, etc.).

In particular embodiments, a social-networking system may maintain a database of advertising content from advertisers and generate and communicate advertisements to users of the social-networking system. The social-networking system may increase effectiveness of advertising by providing an advertisement that is targeted to a user who is likely to be interested in the advertisement. U.S. application Ser. No. 12/195,321, incorporated by reference in its entirety, describes a system that selects advertisements by matching targeting criteria of advertisements and a user's profile information and past actions, and presents the selected advertisements to the user. The social-networking system may also generate and communicate advertisements to a user based on the user's social graph information. For example, in additional to presenting an advertisement that is targeted to a particular user, the social-networking system may communicate information about the advertisement to other users connected to the particular user. U.S. application Ser. No. 12/193,702 describes a system that selects advertisements for a targeted user by matching targeting criteria of advertisements and past actions of another user connected to the targeted user and presented information about the matched action and the selected advertisements to the targeted user.

In particular embodiments, the mobile device may vary the frequency of collecting location information or transmitting the location data based on the type of location signal and its associated battery cost. As an example, reporting a GPS location has a much higher battery cost than that of Wi-Fi or Bluetooth location. As such, in particular embodiments, the mobile device may determine the cost handoff between the type of signal to be collected and how important it is to collect the location information given the contextual factors discussed above in accessing when and how frequently to capture and collect the location information and/or send it to servers of the social-networking system so as to minimize the burden and resource strain on the mobile device. In particular embodiments, the mobile device may vary the frequency and timing of collecting location information based on mobile-device-specific, user-specific, and location specific contextual factors discussed above, and may correspond the upload of the location information to servers of the social-networking system to the frequency and timing of the collecting of the location information (e.g., the mobile device may connect the collection step with the upload step). Alternatively, the mobile device may vary the frequency and timing of collection location information based on the mobile-device-specific, user-specific, and location specific contextual factors, and also vary the frequency and timing of uploading the location information to servers of the social-networking system based on the same or different mobile-device-specific, user-specific, and location specific contextual factors. As an example, the frequency and timing of uploading the location information to servers of the social-networking system may be based on the importance of notifying the social-networking system of the location of the user (e.g., in the situation of the user being at a typical location vs. a new location, in the situation of the user being at a location associated with advertising offers or social-networking events; etc.). Although this disclosure describes particular methods for determining the frequency of collecting location information from a user's mobile device and transmitting the location information, this disclose contemplates any suitable method or combination of methods for determining the frequency of collecting location information from the user's mobile device.

In particular embodiments, the social-networking system may utilize interpolation or other data smoothing algorithms to fill in gaps in the collected location data. As an example, the social-networking system may use such algorithms to fill in a gap in the collected location data in the situation where the user was on a train that went through a tunnel, resulting in a gap during the time when the train traveled through the tunnel. In particular embodiments, the social-networking system may receive location data from numerous mobile devices of users of the social-networking system. Location data for each of these mobile devices may be continuously captured by the respective devices (e.g., by special purpose client applications hosted on these mobile devices) and transmitted to the social-networking system. The social-networking system may then log the locations of all the users whose devices send it location information and use this information to push notifications to one or more of these users. As an example, a push notification system of the social-networking system may alert the mobile device of a first user that another user of the social network (e.g., a friend or first-degree social contact) is in proximity to the first user. Any suitable criteria may be used by the social-networking system (including, for example, whether two users are friends or contacts, and whether they are first-degree contacts or lesser-degree contacts) to determine which other users are of interest to a particular user and what distance from the user is sufficient for the other users to be of relevance (e.g., 1 mile if the user is moving slowly, or 10 miles if the user is moving more quickly). Users of the social-networking system may, in certain embodiments, choose to opt in or opt out of receiving these types of push notifications. A user may also define other settings within the social network, including settings to allow or prevent other users from receiving such location-based push notifications based on the first user's location.

FIG. 1A illustrates examples of sources that may be used to determine and collect location data. Location data 101 may originate from one or more networked devices associated with users of a social-networking system or platform, or networked devices associated with users of a website that collects, directly or indirectly, data associated with its users or visitors. Location data 101 may be collected from a variety of social graph information, including, but not limited to, social graph elements associated with user "likes" 102 registered on the social-networking system, such as "likes" of posts by other users, or "likes" of pages associated with businesses or events. As an example, the social-networking system may determine that these "likes" or posts are associated with the user having been at or within the vicinity of particular entities, businesses, or events. Location data 101 may also include information related to users' friends 103, including the identities and social media pages of those friends, including friends with whom users have high social graph affinity, as well as other information potentially describing the relationship between users. As an example, information on a user's friends may provide information on social signals for providing context on the user's activities and location, and also provide information on when to collect location data to optimize the frequency and timing of collect. Location data 101 may also include information about events 104 that a user has attended or for which a user has indicated they will, or will not, attend. Location data 101 may also include page interactions 105 indicating that a user, through a networked device, has interacted with a page that is associated with or hosted on a social-networking system or website, and that is associated with or relates to another user or business. As an example, information on future scheduled events and interactions with particular social entities may provide additional insight into the user's potential activities and locations and also provide information on when to collect location data to optimize the frequency and timing of collect.

In particular embodiments, a user's social activities may be useful for determining the user's geographic location, in addition to the relative location between the user's geographic location and his/her home location, which may be relevant to helping optimize the timing and collection of location data by the mobile device based on location-specific elements (as discussed above). As an example, a page interaction 105 might be associated with a business located at a particular area and a user's page interaction 105 might then tend to indicate, in conjunction with other information, that a user's home location is within a certain distance from that business. In contrast, a page interaction 105 may be registered for a user related to a business whose location is not near the user's home location, for example, if a user visits a business on vacation, or if a user interacts on the social-networking system with a business with which that user only interacts via the internet.

In the example illustrated in FIG. 1A, a user's predicted home 107 is in San Jose, and location data is shown to be associated with that user corresponding to various locations in the regions of San Jose and Palo Alto. As shown in FIG. 1A, a user's location data may be associated with a number of locations over a variety of time periods, and can also include information that is not limited to one specific location or one specific source. For purposes of illustration, FIG. 1A shows location data associated with a user whose home in San Jose is captured and collected by methods and systems disclosed herein. As disclosed herein, a method implemented on a computer system can collect and capture location data based on a variety of contextual factors for optimizing the frequency and timing of the collection of the location data by the mobile device from various information sources including data received from the user's networked device, such as information related to friends 103, "likes" 102, events 104, page interactions 105, and marketplace transactions 106. The data received might also include data associated with a user's location itself, which can be received from a user's networked device using GPS, if made available by a user, using anonymized cellular network information, or using tags originating from a user's decision to tag data as originating from a certain location or region.

Figure 1B:
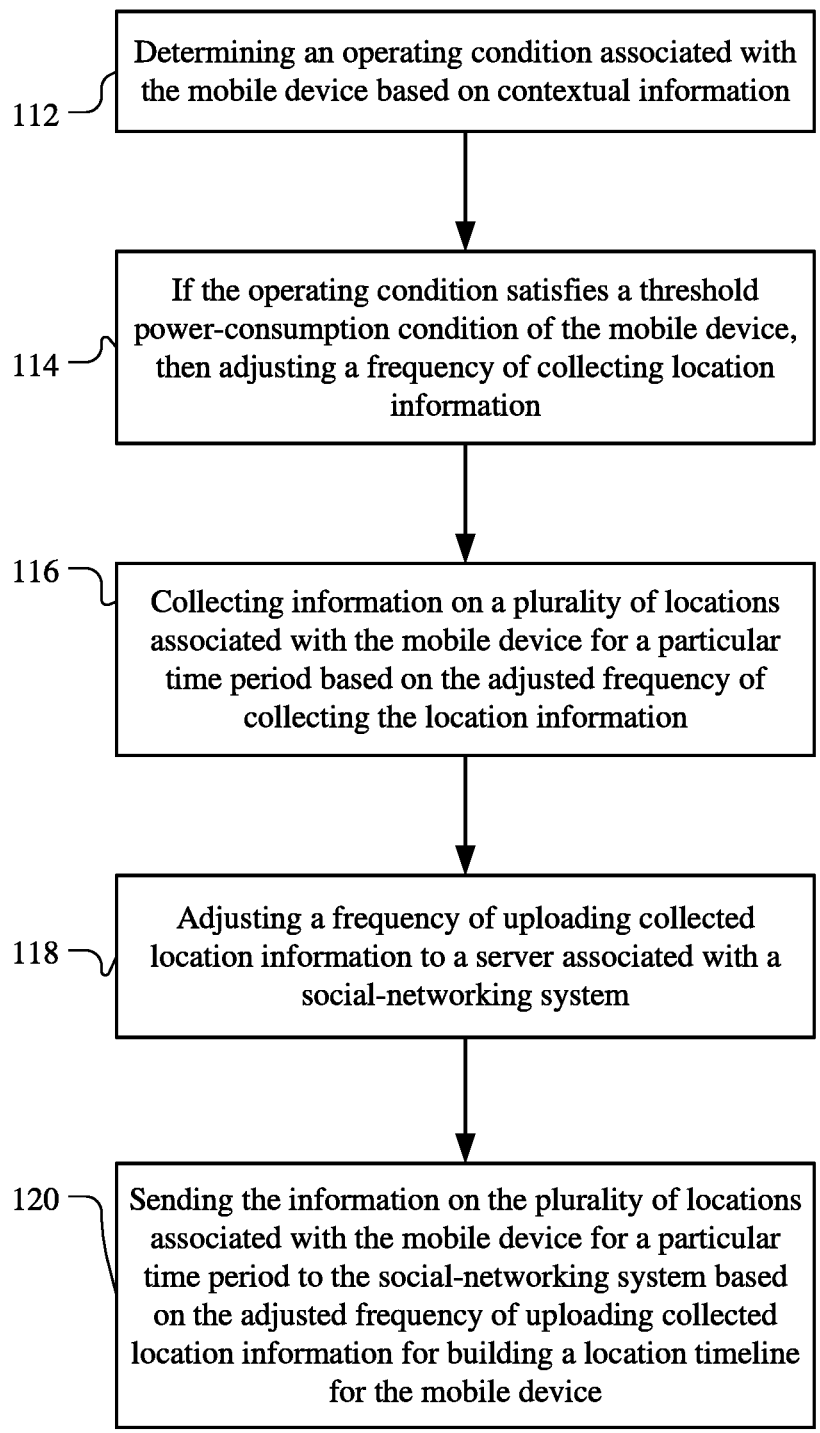
FIG. 1B illustrates an example method for determining an optimal frequency for collecting and transmitting location data.

FIG. 1B illustrates an example method 110 for determining an optimal frequency for collecting and transmitting location data. The method may begin at step 112, when the mobile device collects information on a plurality of locations associated with the mobile device for a particular time period based on the adjusted frequency of collecting the location information. At step 114, the mobile device may determine an operating condition associated with the mobile device based on contextual information. As discussed above, the contextual information may include one or more of usage information of the mobile device, user activity of a user of the mobile device, or location information of the mobile device. At step 116, if the mobile device determines that the operating condition satisfies a threshold power-consumption condition of the mobile device, then the mobile device may adjust a frequency of collecting location information, and subsequently resume collecting information (step 112) based on the adjusted frequency. At step 118, the mobile device may, in conjunction with adjusting the frequency of collecting location information, adjust a frequency of uploading the collected location information to a server associated with a social-networking system. Then, at step 120, the mobile device may upload the information on the plurality of locations associated with the mobile device for a particular time period to the social-networking system based on the adjusted frequency of uploading collected location information for building a location timeline for the mobile device. In particular embodiments, as discussed above, the threshold power-consumption condition may be determined by accessing a maximum frequency of collecting location information for minimizing power consumption of the mobile device. Alternatively, the threshold power-consumption condition may be determined by accessing an optimal timing for collecting location information based on one or more location-information requests from the social-networking system. In addition, the frequency of collecting location information at the mobile device may be adjusted similarly with, or alternatively, separately from, the frequency of uploading collected location information to the server associated with the social-networking system. As discussed above, the usage information associated with the mobile device may include one or more of a signal strength of a communication signal, a speed of movement detected for the mobile device, a network bandwidth of a communication network, or a battery-consumption percentage associated with the mobile device. In addition, the user activity of the user of the mobile device may include one or more of a current time of day or day of week, one or more previously-determined user habits, one or more social signals received from an online social network, or one or more user signals. Furthermore, the location information of the mobile device may include one or more of a current location of the mobile device, a location category associated with the current location, or the determination of the presence of one or more dead zones within a predetermined distance of the current location of the mobile device. In particular embodiments, the current location may be determined based at least in part on a global positioning system (GPS) signal, a Wi-Fi signal; or a cellular radio signal. In addition, as discussed above, the method may further include determining a place associated with the current location of the mobile device, the place corresponding to one or more entities of an online social network, and determining a social significance of the place for the user of the mobile device based on information from the online social network. Particular embodiments may repeat one or more steps of the method of FIG. 1B, where appropriate. Although this disclosure describes and illustrates particular steps of the method of FIG. 1B as occurring in a particular order, this disclosure contemplates any suitable steps of the method of FIG. 1B occurring in any suitable order. In addition, although this disclosure describes and illustrates an example method for determining an optimal frequency for collecting and transmitting location data including the particular steps of the method of FIG. 1B, this disclosure contemplates any suitable method for determining an optimal frequency for collecting and transmitting location data including any suitable steps, which may include all, some, or none of the steps of the method of FIG. 1B, where appropriate. Furthermore, although this disclosure describes and illustrates particular components, devices, or systems carrying out particular steps of the method of FIG. 1B, this disclosure contemplates any suitable combination of any suitable components, devices, or systems carrying out any suitable steps of the method of FIG. 1B.

Figure 2:
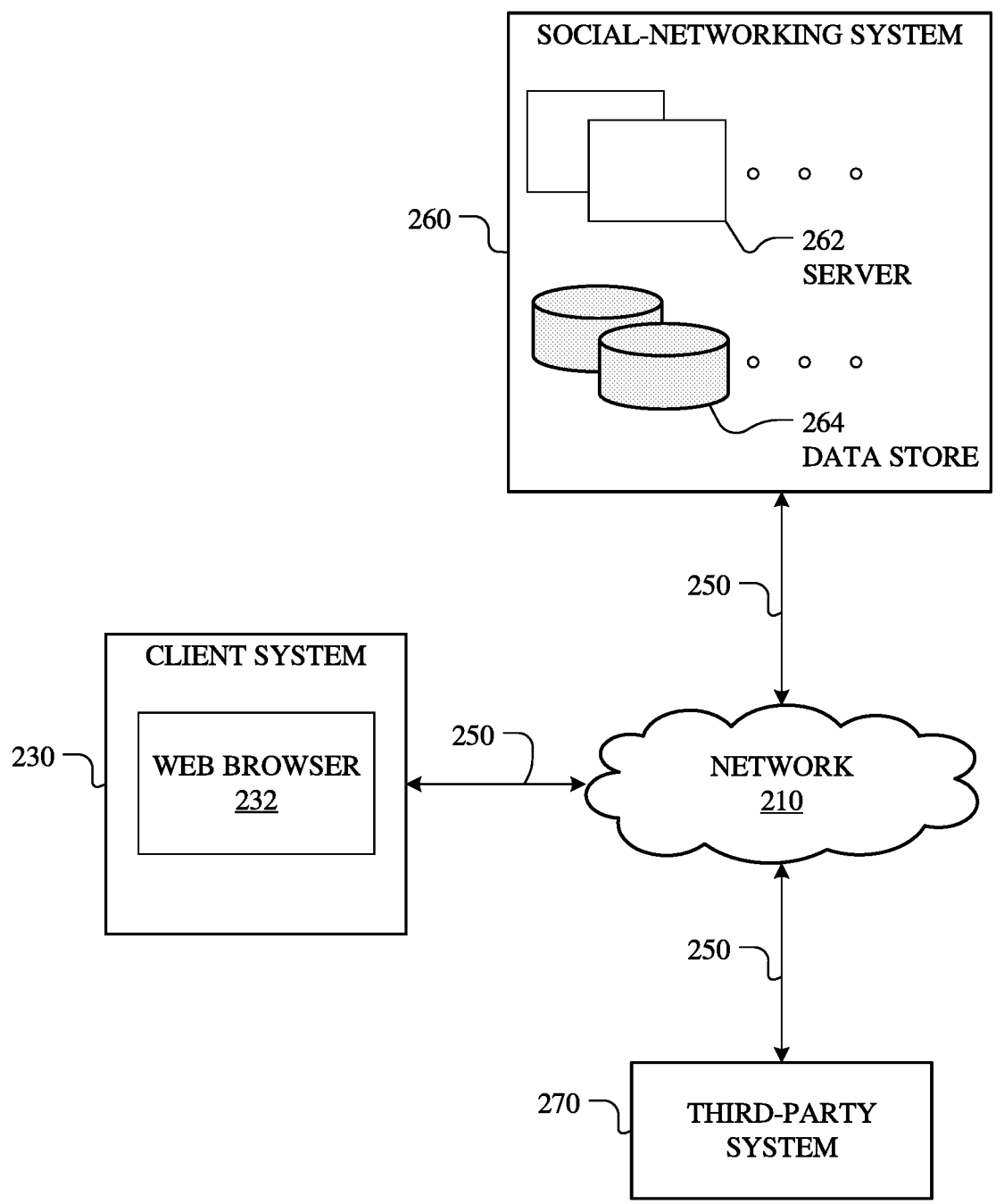
FIG. 2 illustrates an example network environment associated with a social-networking system.

FIG. 2 illustrates an example network environment 200 associated with a social-networking system. Network environment 200 includes a client system 230, a social-networking system 260, and a third-party system 270 connected to each other by a network 210. Although FIG. 2 illustrates a particular arrangement of client system 230, social-networking system 260, third-party system 270, and network 210, this disclosure contemplates any suitable arrangement of client system 230, social-networking system 260, third-party system 270, and network 210. As an example and not by way of limitation, two or more of client system 230, social-networking system 260, and third-party system 270 may be connected to each other directly, bypassing network 210. As another example, two or more of client system 230, social-networking system 260, and third-party system 270 may be physically or logically co-located with each other in whole or in part. Moreover, although FIG. 2 illustrates a particular number of client systems 230, social-networking systems 260, third-party systems 270, and networks 210, this disclosure contemplates any suitable number of client systems 230, social-networking systems 260, third-party systems 270, and networks 210. As an example and not by way of limitation, network environment 200 may include multiple client system 230, social-networking systems 260, third-party systems 270, and networks 210.

This disclosure contemplates any suitable network 210. As an example and not by way of limitation, one or more portions of network 210 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 210 may include one or more networks 210.

Links 250 may connect client system 230, social-networking system 260, and third-party system 270 to communication network 210 or to each other. This disclosure contemplates any suitable links 250. In particular embodiments, one or more links 250 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 250 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 250, or a combination of two or more such links 250. Links 250 need not necessarily be the same throughout network environment 200. One or more first links 250 may differ in one or more respects from one or more second links 250.

In particular embodiments, client system 230 may be an electronic device including hardware, software, or embedded logic components or a combination of two or more such components and capable of carrying out the appropriate functionalities implemented or supported by client system 230. As an example and not by way of limitation, a client system 230 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 230. A client system 230 may enable a network user at client system 230 to access network 210. A client system 230 may enable its user to communicate with other users at other client systems 230.

In particular embodiments, client system 230 may include a web browser 232, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 230 may enter a Uniform Resource Locator (URL) or other address directing the web browser 232 to a particular server (such as server 262, or a server associated with a third-party system 270), and the web browser 232 may generate a Hyper Text Transfer Protocol (HTTP) request and communicate the HTTP request to server. The server may accept the HTTP request and communicate to client system 230 one or more Hyper Text Markup Language (HTML) files responsive to the HTTP request. Client system 230 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 260 may be a network-addressable computing system that can host an online social network. Social-networking system 260 may generate, store, receive, and send social-networking data, such as, for example, user-profile data, concept-profile data, social-graph information, or other suitable data related to the online social network. Social-networking system 260 may be accessed by the other components of network environment 200 either directly or via network 210. As an example and not by way of limitation, client system 230 may access social-networking system 260 using a web browser 232, or a native application associated with social-networking system 260 (e.g., a mobile social-networking application, a messaging application, another suitable application, or any combination thereof) either directly or via network 210. In particular embodiments, social-networking system 260 may include one or more servers 262. Each server 262 may be a unitary server or a distributed server spanning multiple computers or multiple datacenters. Servers 262 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 262 may include hardware, software, or embedded logic components or a combination of two or more such components for carrying out the appropriate functionalities implemented or supported by server 262. In particular embodiments, social-networking system 260 may include one or more data stores 264. Data stores 264 may be used to store various types of information. In particular embodiments, the information stored in data stores 264 may be organized according to specific data structures. In particular embodiments, each data store 264 may be a relational, columnar, correlation, or other suitable database. Although this disclosure describes or illustrates particular types of databases, this disclosure contemplates any suitable types of databases. Particular embodiments may provide interfaces that enable a client system 230, a social-networking system 260, or a third-party system 270 to manage, retrieve, modify, add, or delete, the information stored in data store 264.

In particular embodiments, social-networking system 260 may store one or more social graphs in one or more data stores 264. In particular embodiments, a social graph may include multiple nodes—which may include multiple user nodes (each corresponding to a particular user) or multiple concept nodes (each corresponding to a particular concept)—and multiple edges connecting the nodes. Social-networking system 260 may provide users of the online social network the ability to communicate and interact with other users. In particular embodiments, users may join the online social network via social-networking system 260 and then add connections (e.g., relationships) to a number of other users of social-networking system 260 to whom they want to be connected. Herein, the term "friend" may refer to any other user of social-networking system 260 with whom a user has formed a connection, association, or relationship via social-networking system 260.

In particular embodiments, social-networking system 260 may provide users with the ability to take actions on various types of items or objects, supported by social-networking system 260. As an example and not by way of limitation, the items and objects may include groups or social networks to which users of social-networking system 260 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 260 or by an external system of third-party system 270, which is separate from social-networking system 260 and coupled to social-networking system 260 via a network 210.

In particular embodiments, social-networking system 260 may be capable of linking a variety of entities. As an example and not by way of limitation, social-networking system 260 may enable users to interact with each other as well as receive content from third-party systems 270 or other entities, or to allow users to interact with these entities through an application programming interfaces (API) or other communication channels.

In particular embodiments, a third-party system 270 may include one or more types of servers, one or more data stores, one or more interfaces, including but not limited to APIs, one or more web services, one or more content sources, one or more networks, or any other suitable components, e.g., that servers may communicate with. A third-party system 270 may be operated by a different entity from an entity operating social-networking system 260. In particular embodiments, however, social-networking system 260 and third-party systems 270 may operate in conjunction with each other to provide social-networking services to users of social-networking system 260 or third-party systems 270. In this sense, social-networking system 260 may provide a platform, or backbone, which other systems, such as third-party systems 270, may use to provide social-networking services and functionality to users across the Internet.

In particular embodiments, a third-party system 270 may include a third-party content object provider. A third-party content object provider may include one or more sources of content objects, which may be communicated to a client system 230. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 260 also includes user-generated content objects, which may enhance a user's interactions with social-networking system 260. User-generated content may include anything a user can add, upload, send, or "post" to social-networking system 260. As an example and not by way of limitation, a user communicates posts to social-networking system 260 from a client system 230. Posts may include data such as status updates or other textual data, location information, photos, videos, links, music or other similar data or media. Content may also be added to social-networking system 260 by a third-party through a "communication channel," such as a newsfeed or stream.

In particular embodiments, social-networking system 260 may include a variety of servers, sub-systems, programs, modules, logs, and data stores. In particular embodiments, social-networking system 260 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 260 may also include suitable components such as network interfaces, security mechanisms, load balancers, failover servers, management-and-network-operations consoles, other suitable components, or any suitable combination thereof. In particular embodiments, social-networking system 260 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 260 to one or more client systems 230 or one or more third-party system 270 via network 210. The web server may include a mail server or other messaging functionality for receiving and routing messages between social-networking system 260 and one or more client systems 230. An API-request server may allow a third-party system 270 to access information from social-networking system 260 by calling one or more APIs. An action logger may be used to receive communications from a web server about a user's actions on or off social-networking system 260. In conjunction with the action log, a third-party-content-object log may be maintained of user exposures to third-party-content objects. A notification controller may provide information regarding content objects to a client system 230. Information may be pushed to a client system 230 as notifications, or information may be pulled from client system 230 responsive to a request received from client system 230. Authorization servers may be used to enforce one or more privacy settings of the users of social-networking system 260. A privacy setting of a user determines how particular information associated with a user can be shared. The authorization server may allow users to opt in to or opt out of having their actions logged by social-networking system 260 or shared with other systems (e.g., third-party system 270), such as, for example, by setting appropriate privacy settings. Third-party-content-object stores may be used to store content objects received from third parties, such as a third-party system 270. Location stores may be used for storing location information received from client systems 230 associated with users. Advertisement-pricing modules may combine social information, the current time, location information, or other suitable information to provide relevant advertisements, in the form of notifications, to a user.

Figure 3:
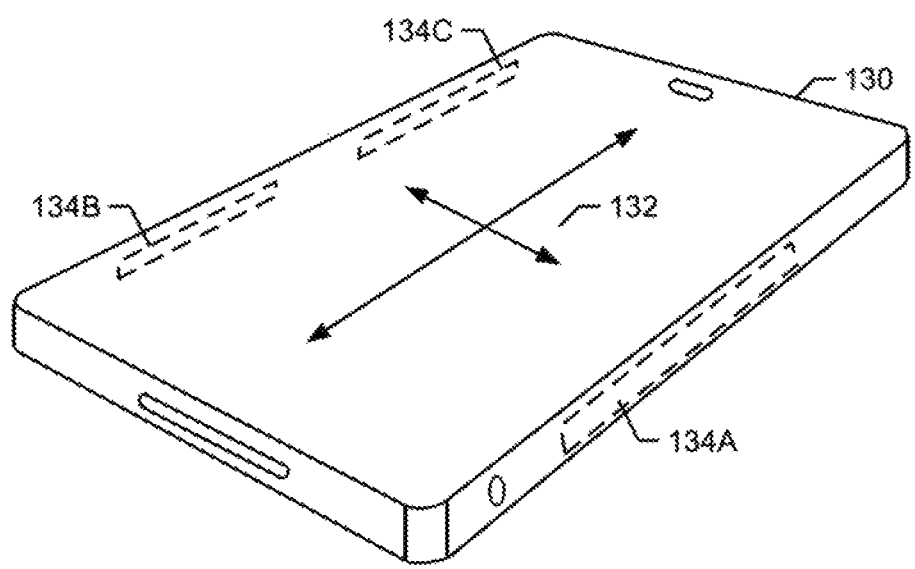
FIG. 3 illustrates an example mobile-client system.

FIG. 3 illustrates an example mobile client system 130. This disclosure contemplates mobile client system 130 taking any suitable physical form. In particular embodiments, mobile client system 130 may be a computing system as described below. As example and not by way of limitation, mobile client system 130 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile client system 130 may have a touch sensor 132 as an input component. In the example of FIG. 3, touch sensor 132 is incorporated on a front surface of mobile client system 130. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 3, one or more antennae 134A, 134B, 134C may be incorporated into one or more sides of mobile client system 130. Antennae 134A, 134B, 134C are components that convert electric current into radio waves, and vice versa. During transmission of signals, a transmitter applies an oscillating radio frequency (RF) electric current to terminals of antennae 134A, 134B, 134C, and antennae 134A, 134B, 134C radiates the energy of the applied the current as electromagnetic (EM) waves. During reception of signals, antennae 134A, 134B, 134C convert the power of an incoming EM wave into a voltage at the terminals of antennae 134A, 134B, 134C. The voltage may be transmitted to a receiver for amplification.

In particular embodiments, mobile client system 130 many include a communication component coupled to antennae 134A, 134B, 134C for communicating with an Ethernet or other wire-based network or a wireless MC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component 20 for it. As an example and not by way of limitation, mobile client system 130 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile client system 130 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile client system 130 may include any suitable communication component for any of these networks, where appropriate.

In particular embodiments, the communication component coupled to antennae 134A, 134B, 134C mobile client system 130 may be configured to determine location data based on global positioning system (GPS) signals, cellular triangulation, wireless hotspots, or any suitable methods for determining location data. In particular embodiments, the location service of mobile client system 130 may use one or more methods of location determination, such as for example, using the location of one or more cellular towers, crowd-sourced location information associated with a WI-FI hotspot, or a GPS function of mobile client system 130. As an example and not by way of limitation, the application may use GPS data as the primary source of location information depending at least in part on whether mobile client system 130 is able to acquire GPS data within a pre-determined period of time. As another example, if mobile client system 130 is unable to acquire the GPS data within the pre-determined sampling duration, the application may use the location determined using one or more cellular towers or WI-FI hotspots. Although this disclosure describes a location service using particular methods of location determination, this disclosure contemplates a location service using any suitable method or combination of methods of location detection.

Figure 4:
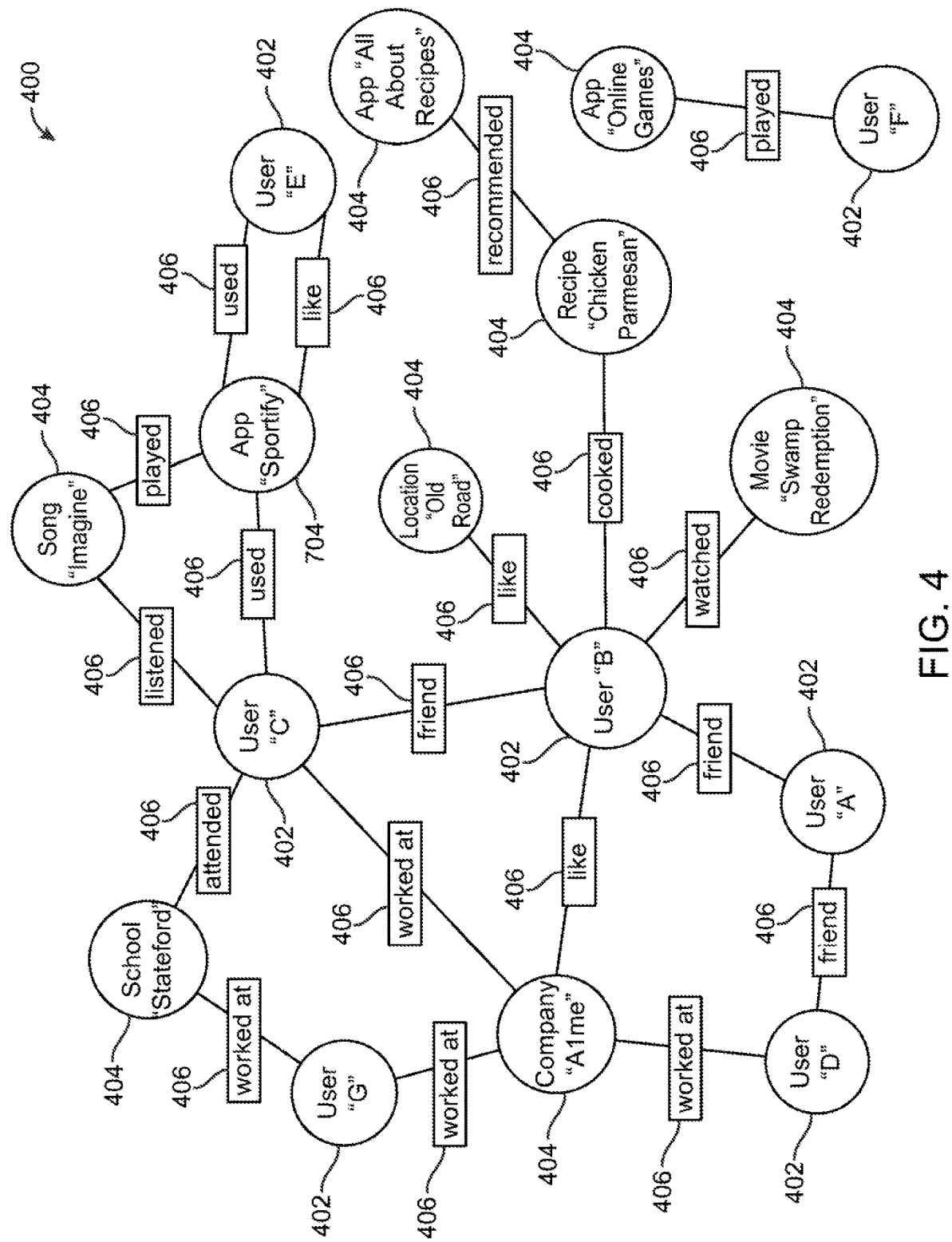
FIG. 4 illustrates an example social graph.

FIG. 4 illustrates example social graph 400. In particular embodiments, social-networking system 260 may store one or more social graphs 400 in one or more data stores. In particular embodiments, social graph 400 may include multiple nodes—which may include multiple user nodes 402 or multiple concept nodes 404—and multiple edges 406 connecting the nodes. Each node may be associated with a unique entity (i.e., user or concept), each of which may have a unique identifier (ID), such as a unique number or username. Example social graph 400 illustrated in FIG. 4 is shown, for didactic purposes, in a two-dimensional visual map representation. In particular embodiments, a social-networking system 260, client system 230, or third-party system 270 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 260. As an example and not by way of limitation, a user may be an individual (human user), an entity (e.g., an enterprise, business, or third-party application), or a group (e.g., of individuals or entities) that interacts or communicates with or over social-networking system 260. In particular embodiments, when a user registers for an account with social-networking system 260, social-networking system 260 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 260. In particular embodiments, a user node 402 may be associated with information provided by a user or information gathered by various systems, including social-networking system 260. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 260 or a third-party website associated with a web-application server); an entity (such as, for example, a person, business, group, sports team, or celebrity); a resource (such as, for example, an audio file, video file, digital photo, text file, structured document, or application) which may be located within social-networking system 260 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 404 may be associated with information of a concept provided by a user or information gathered by various systems, including social-networking system 260. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 260. Profile pages may also be hosted on third-party websites associated with a third-party system 270. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 270. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 230 to send to social-networking system 260 a message indicating the user's action. In response to the message, social-networking system 260 may create an edge (e.g., a check-in-type edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 260 may send a "friend request" to the second user. If the second user confirms the "friend request," social-networking system 260 may create an edge 406 connecting the first user's user node 402 to the second user's user node 402 in social graph 400 and store edge 406 as social-graph information in one or more of data stores 264. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406. The degree of separation between two objects represented by two nodes, respectively, is a count of edges in a shortest path connecting the two nodes in the social graph 400. As an example and not by way of limitation, in the social graph 400, the user node 402 of user "C" is connected to the user node 402 of user "A" via multiple paths including, for example, a first path directly passing through the user node 402 of user "B," a second path passing through the concept node 404 of company "Acme" and the user node 402 of user "D," and a third path passing through the user nodes 402 and concept nodes 404 representing school "Stanford," user "G," company "Acme," and user "D." User "C" and user "A" have a degree of separation of two because the shortest path connecting their corresponding nodes (i.e., the first path) includes two edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to an edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 260 may create a "favorite" edge or a "check in" edge in response to a user's action corresponding to a respective action. As another example and not by way of limitation, a user (user "C") may listen to a particular song ("Imagine") using a particular application (an online music application). In this case, social-networking system 260 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 260 may create a "played" edge 406 (as illustrated in FIG. 4) between concept nodes 404 corresponding to the song and the application to indicate that the particular song was played by the particular application. In this case, "played" edge 406 corresponds to an action performed by an external application on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404).

In particular embodiments, social-networking system 260 may create an edge 406 between a user node 402 and a concept node 404 in social graph 400. As an example and not by way of limitation, a user viewing a concept-profile page (such as, for example, by using a web browser or a special-purpose application hosted by the user's client system 230) may indicate that he or she likes the concept represented by the concept node 404 by clicking or selecting a "Like" icon, which may cause the user's client system 230 to send to social-networking system 260 a message indicating the user's liking of the concept associated with the concept-profile page. In response to the message, social-networking system 260 may create an edge 406 between user node 402 associated with the user and concept node 404, as illustrated by "like" edge 406 between the user and concept node 404. In particular embodiments, social-networking system 260 may store an edge 406 in one or more data stores. In particular embodiments, an edge 406 may be automatically formed by social-networking system 260 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 260). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 260 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 260) or RSVP (e.g., through social-networking system 260) to an event associated with the advertisement. In addition or as an alternative, an advertisement may include social-networking-system content directed to the user. As an example and not by way of limitation, an advertisement may display information about a friend of the user within social-networking system 260 who has taken an action associated with the subject matter of the advertisement.

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, a third-party system 170, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof.

A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 204 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 200. A privacy setting may be specified for one or more edges 206 or edge-types of the social graph 200, or with respect to one or more nodes 202, 204 or node-types of the social graph 200. The privacy settings applied to a particular edge 206 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 204 connected to a user node 202 of the first user by an edge 206. The first user may specify privacy settings that apply to a particular edge 206 connecting to the concept node 204 of the object, or may specify privacy settings that apply to all edges 206 connecting to the concept node 204. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 may access such information in order to provide a particular function or service to the first user, without the social-networking system 160 having access to that information for any other purposes. Before accessing, storing, or using such objects or information, the social-networking system 160 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160.

In particular embodiments, a user may specify whether particular types of objects or information associated with the first user may be accessed, stored, or used by the social-networking system 160. As an example and not by way of limitation, the first user may specify that images sent by the first user through the social-networking system 160 may not be stored by the social-networking system 160. As another example and not by way of limitation, a first user may specify that messages sent from the first user to a particular second user may not be stored by the social-networking system 160. As yet another example and not by way of limitation, a first user may specify that all objects sent via a particular application may be saved by the social-networking system 160.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 may provide default privacy settings with respect to each device, system, or application, and/or the first user may be prompted to specify a particular privacy setting for each context. As an example and not by way of limitation, the first user may utilize a location-services feature of the social-networking system 160 to provide recommendations for restaurants or other places in proximity to the user. The first user's default privacy settings may specify that the social-networking system 160 may use location information provided from a client device 130 of the first user to provide the location-based services, but that the social-networking system 160 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

Figure 5:
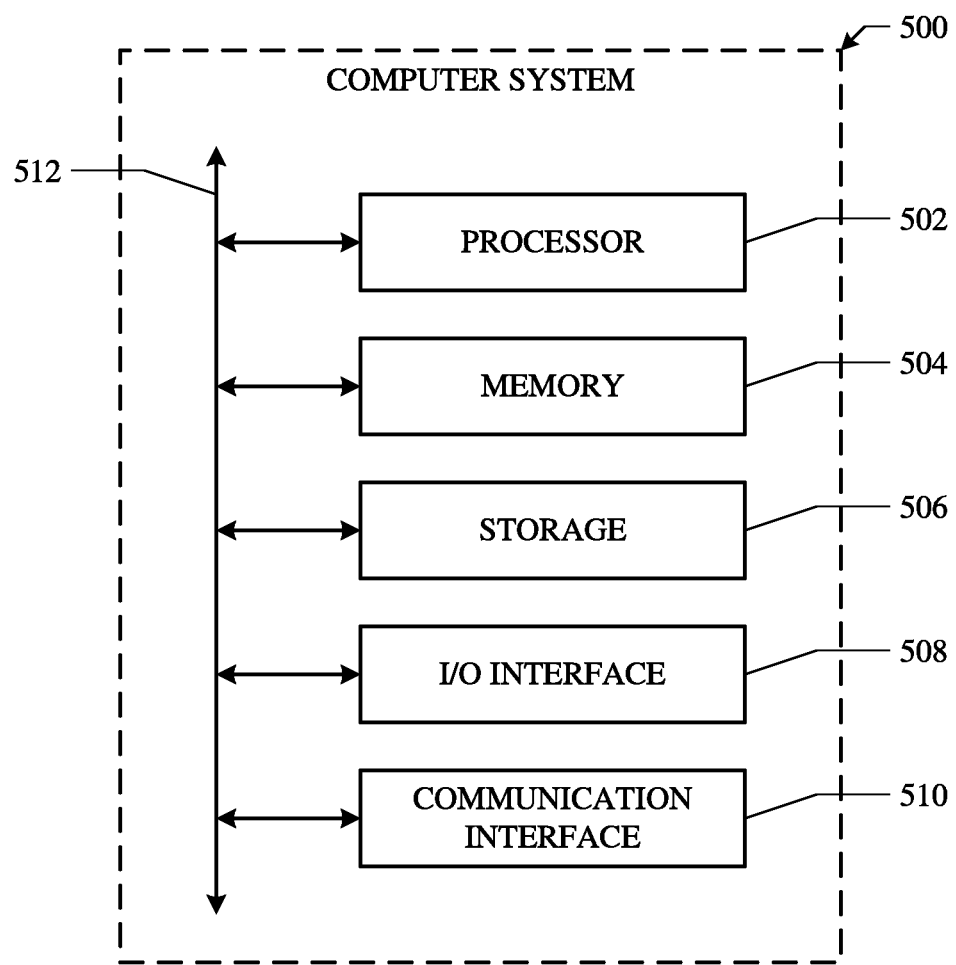
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them.

During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RANI may be volatile memory, where appropriate. Where appropriate, this RANI may be dynamic RANI (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (MC) or network adapter for communicating with an Ethernet or other wire-based network or a wireless MC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   determining, by one or more processors of a mobile device associated with a user, an operating condition associated with the mobile device, wherein the operating condition is based on contextual information associated with social graph information received from an online social network associated with a current location of the mobile device;
   if the operating condition satisfies a threshold power-consumption condition of the mobile device, then dynamically adjusting, by the processors of the mobile device, a first frequency and timing of collecting location information at the mobile device, wherein the threshold power-consumption condition is determined based on a power consumption of collecting the location information and an importance of the location information based on the operating condition;
   collecting, by a client application hosted on the mobile device, information on the current location associated with the mobile device for a particular time period based on the dynamically adjusted frequency and timing of collecting the location information, wherein collecting information on the current location associated with the mobile device comprises accessing the geo-location functions of the mobile device;
   adjusting, by the processors of the mobile device, a second frequency and timing of uploading collected location information to a server associated with the online social network; and
   uploading, by the client application hosted on the mobile device, the information on the current location associated with the mobile device for the particular time period collected by the client application to the location data stores of the server of the online social network based on the adjusted frequency and timing of uploading collected location information.

2. The method of claim 1, wherein the first frequency and timing of collecting location information at the mobile device is dynamically adjusted separately from the second frequency and timing of uploading collected location information to the server associated with the online social network.

3. The method of claim 1, wherein the threshold power-consumption condition is further determined by accessing a maximum frequency of collecting location information for minimizing power consumption of the mobile device.

4. The method of claim 1, wherein the threshold power-consumption condition is further determined by accessing an optimal timing for collecting location information based on one or more location-information requests from the online social network.

5. The method of claim 1, wherein the operating condition is further based on contextual information associated with usage information associated with the mobile device comprising one or more of:
   a signal strength of a communication signal,
   a speed of movement detected for the mobile device,
   a network bandwidth of a communication network, or
   a battery-consumption percentage associated with the mobile device.

6. The method of claim 1, wherein the operating condition is further based on contextual information associated with user activity of the user associated with the mobile device comprising one or more of:
   a current time of day or day of week,
   one or more previously-determined user habits,
   one or more social signals received from the online social network, or
   one or more user signals.

7. The method of claim 1, wherein the importance of the location information is further based on the importance of notifying the online social network of the location of the user of the mobile device.

8. The method of claim 1, wherein the operating condition is further based on location information of the mobile device comprising one or more of:
   the current location of the mobile device,
   a location category associated with the current location, or
   the determination of the presence of one or more dead zones within a predetermined distance of the current location of the mobile device.

9. The method of claim 8, wherein the current location is determined based at least in part on:
   a global positioning system (GPS) signal;
   a Wi-Fi signal; or
   a cellular radio signal.

10. The method of claim 8, further comprising:
    determining a place associated with the current location of the mobile device, the place corresponding to one or more entities of the online social network, and determining a social significance of the place for the user associated with the mobile device based on information from the online social network.

11. One or more computer-readable non-transitory storage media embodying software that is operable when executed to:
- determine, by one or more processors of a mobile device associated with a user, an operating condition associated with the mobile device, wherein the operating condition is based on contextual information associated with social graph information received from an online social network associated with a current location of the mobile device;
- if the operating condition satisfies a threshold power-consumption condition of the mobile device, then dynamically adjust, by the processors of the mobile device, a first frequency and timing of collecting location information at the mobile device, wherein the threshold power-consumption condition is determined based on a power consumption of collecting the location information and an importance of the location information based on the operating condition;
- collect, by a client application hosted on the mobile device, information on the current location associated with the mobile device for a particular time period based on the dynamically adjusted frequency and timing of collecting the location information, wherein collecting information on the current location associated with the mobile device comprises accessing the geo-location functions of the mobile device;
- adjust, by the processors of the mobile device, a second frequency and timing of uploading collected location information to a server associated with the online social network; and
- upload, by the client application hosted on the mobile device, the information on the current location associated with the mobile device for the particular time period collected by the client application to the location data stores of the server of the online social network based on the adjusted frequency and timing of uploading collected location information.

12. The media of claim 11, wherein the first frequency and timing of collecting location information at the mobile device is dynamically adjusted separately from the second frequency and timing of uploading collected location information to the server associated with the online social network.

13. The media of claim 11, wherein the threshold power-consumption condition is further determined by accessing a maximum frequency of collecting location information for minimizing power consumption of the mobile device.

14. The media of claim 11, wherein the threshold power-consumption condition is further determined by accessing an optimal timing for collecting location information based on one or more location-information requests from the online social network.

15. A system comprising: one or more processors; and one or more computer-readable non-transitory storage media coupled to one or more of the processors and comprising instructions operable when executed by one or more of the processors to cause the system to:
- determine, by one or more processors of a mobile device associated with a user, an operating condition associated with the mobile device, wherein the operating condition is based on contextual information associated with social graph information received from an online social network associated with a current location of the mobile device;
- if the operating condition satisfies a threshold power-consumption condition of the mobile device, then dynamically adjust, by the processors of the mobile device, a first frequency and timing of collecting location information at the mobile device, wherein the threshold power-consumption condition is determined based on a power consumption of collecting the location information and an importance of the location information based on the operating condition;
- collect, by a client application hosted on the mobile device, information on the current location associated with the mobile device for a particular time period based on the dynamically adjusted frequency and timing of collecting the location information, wherein collecting information on the current location associated with the mobile device comprises accessing the geo-location functions of the mobile device;
- adjust, by the processors of the mobile device, a second frequency and timing of uploading collected location information to a server associated with the online social network; and
- upload, by the client application hosted on the mobile device, the information on the current location associated with the mobile device for the particular time period collected by the client application to the location data stores of the server of the online social network based on the adjusted frequency and timing of uploading collected location information.

16. The system of claim 15, wherein the first frequency and timing of collecting location information at the mobile device is dynamically adjusted separately from the second frequency and timing of uploading collected location information to the server associated with the online social network.

17. The system of claim 15, wherein the threshold power-consumption condition is further determined by accessing a maximum frequency of collecting location information for minimizing power consumption of the mobile device.

18. The system of claim 15, wherein the threshold power-consumption condition is further determined by accessing an optimal timing for collecting location information based on one or more location-information requests from the online social network.

* * * * *